March 10, 1959 C. G. REYNARD 2,876,554
GUN ASSEMBLY ALIGNING DEVICE
Filed Sept. 27, 1956
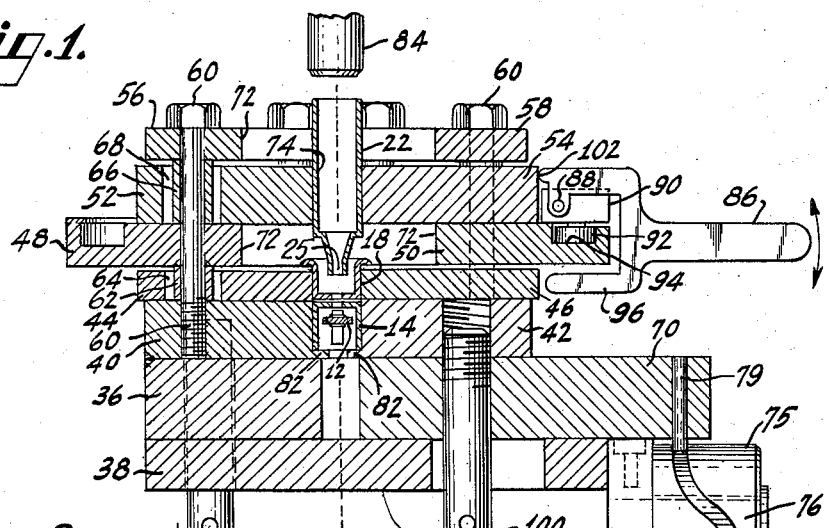
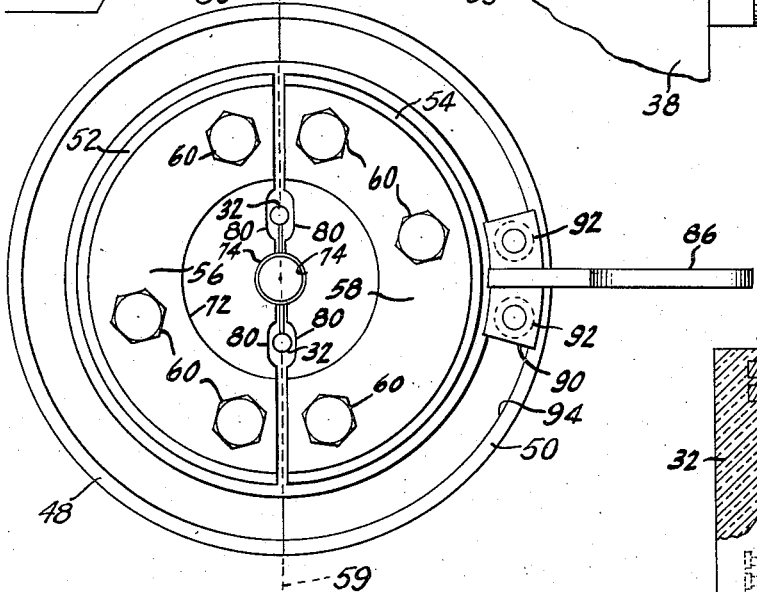
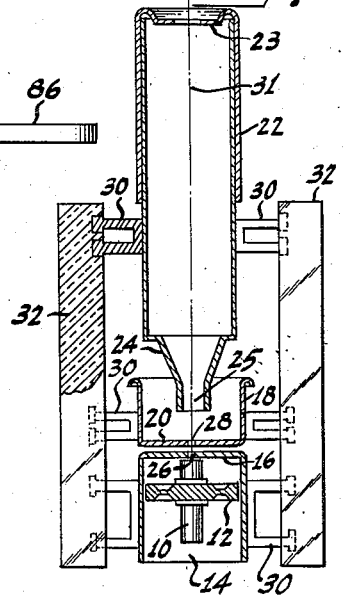
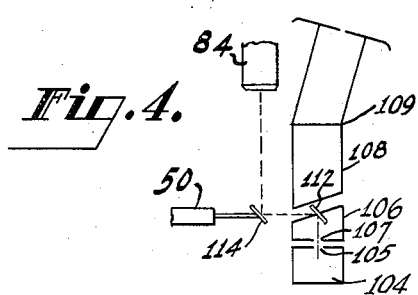
INVENTOR.
CHAUNCY G. REYNARD
BY
William A. Zaleeak
ATTORNEY

United States Patent Office 2,876,554
Patented Mar. 10, 1959

2,876,554

GUN ASSEMBLY ALIGNING DEVICE

Chauncy G. Reynard, Marion, Ind., assignor to Radio Corporation of America, a corporation of Delaware Application September 27, 1956, Serial No. 612,420

10 Claims. (Cl. 33—181)

The invention is directed to a device for aligning apertured members, and particularly for aligning apertures in a plurality of electrodes for a discharge device.

The invention is described specifically as related to equipment for aligning the apertures in adjacent electrodes of an electron gun for a cathode-ray tube. However, the specific details of the invention need not be limiting to this specific application, since similar devices can also be utilized for aligning apertures in electrodes of other discharge tubes or other mechanical assemblies where misalignment of parts needs to be corrected.

A cathode-ray tube gun normally comprises a plurality of apertured plate and tubular electrodes for producing an electron beam. These electrodes are mounted into a rigid unitary structure, with the apertures of the plates and tubular electrodes being in alignment. The operation of the electron gun is quite critical and depends upon the accuracy of alignment of the apertures through which the electron beam must pass. It is therefore a requisite that the gun electrodes of a cathode-ray tube for example, be accurately aligned for optimum gun operation.

It is therefore an object of this invention to provide a novel device for aligning apertured parts mechanically.

It is another object of this invention to provide a novel piece of equipment for aligning apertures in a plurality of electrode parts for a discharge tube.

It is also an object of this invention to provide a novel aligning device for aligning the electrode apertures in adjacent electrode structures of a cathode-ray tube gun.

The invention is directed to a piece of equipment in which an assembly of electrode parts can be placed and the parts optically aligned for optimum tube operation. The equipment includes means for holding the electrode assembly and movable plate portions for moving an electrode relative to another for accurate alignment.

Figure 1 is a view partly in section of the aligning device in accordance with the invention;

Figure 2 is a plan view of the aligning device of Figure 1;

Figure 3 is a view in section of an electron gun structure for a cathode-ray tube, and;

Figure 4 is a partial view of a modification of the alignment device shown in Figures 1 and 2.

Figures 1 and 2 disclose a device for aligning electrode structures which have been previously misaligned during their assembly together into a unitary assembly.

Figure 3 discloses a sub-assembly of electrode structures which can be accurately aligned by the device of Figures 1 and 2. The electrode structure, shown in Figure 3, is specifically a portion of a cathode-ray tube electron gun. The description of the alignment device and its operation is described below relative to this electron gun structure. However, it will be apparent that the alignment device described need not be confined specifically to the particular structure of Figure 3 nor to electron guns in general, but also has utility in aligning electrodes for use in other discharge devices and even in correcting the misalignment of any assembly of parts.

The electrode assembly of Figure 3 comprises a plurality of electrodes, which are assembled as is shown to form a portion of an electron gun which is used in a cathode-ray tube. The assembly consists principally of a cathode electrode cylinder 10, which is closed by an end wall at the upper end thereof shown in Figure 3. Cathode cylinder 10 is mounted through a ceramic spacer 12 fixed within a control electrode cylinder 14, which is open at the lower end thereof, as shown in Figure 3, but closed by an end wall portion 16 at its upper end. Mounted adjacent to the end wall portion 16 of electrode 14 is a cup-shaped electrode 18, the bottom portion 20 of which is formed as a wall closing the cup and positioned substantially parallel to the control grid wall 16. A second accelerating electrode is formed as a tubular member 22 having a reduced end portion 24 telescoped into the electrode cup 18. The wall plate portions 16 and 20 are formed with small apertures 26 and 28 respectively. The several electrodes are rigidly mounted together by means of metal studs 30 mounted on opposite sides of each electrode such that those on one side lie substantially in a common plane. All of the studs 30 on one side of the several electrodes are pressed into a heat softened glass rod 32, which, when allowed to cool, firmly grips the end portions of the respective studs 30 to firmly hold the electrodes 14, 18 and 22 in a rigid assembly.

In the operation of the electrode assembly, shown in Figure 3, electrons are emitted from the closed end portion of electrode 10 and are accelerated through apertures 26 and 28 and the reduced portion 24 of electrode 22. The several electrodes are maintained at different potentials so that there is formed between each electrode an electron lens field which accelerates and focuses the electrons into a beam which has a minimum cross sectional area at the fluorescent screen of the tube. It is necessary that the apertures 26, 28 and 25 be accurately aligned with each other so that the lens fields formed between and in these apertures are all symmetrically disposed relative to the axis of the electrode structure. Any misalignment of these apertures introduces a distortion into the lens field formed between the apertures. This, in turn causes a distortion of the electron beam itself by causing it to become non-symmetrical relative to axis 31 and also tends to bend the beam away from axis 31, so that the beam itself will not pass through succeeding focusing fields of the gun as well as the deflection fields used to scan the electron beam over the fluorescent screen. The misalignment of electrode parts then results in the beam striking the fluorescent screen in a distorted spot, and results in poor resolution of the television picture. Furthermore, any deflection of the beam from the electrode axis 31 causes the beam to strike opaque portions of the apertured plate 23 which reduces the total beam current passing through plate 23 toward the screen. Furthermore, the electron beam in being deflected from its axis will pass through off-center areas of the subsequent focusing and deflecting fields, which produce greater aberration effects on the beam to further defocus the beam at the screen.

Therefore, in accordance with the invention a device is provided for accurately aligning the apertures of an electron gun of the type shown in Figure 3. As shown in Figures 1 and 2, the alignment device includes a support plate 36 which is a portion of an angle iron which in turn rests on a base plate 38. Mounted on the support plate 36 is a base structure consisting of two portions 40 and 42 each of which is of a semi-cylindrical shape of equal size. Slidably mounted on the top surface of base structures 40 and 42 is mounted a first electrode retainer plate also formed in two semi-cylindrical matching portions 44 and 46. Supported above these two portions 44 and 46 of the first electrode retainer plate is an alignment plate also comprising a pair of semi-cylindrical matching portions 48 and 50. Slidably supported on the alignment plate portions 48 and 50 is a second electrode retainer plate comprising a pair of matching semi-cylindrical portions 52 and 54. Positioned about the plate portions 52 and 54 is a retainer plate also comprising a pair of semi-cylindrical portions 56 and 58.

As shown in Figures 1 and 2 the semi-cylindrical portions 40 and 42, 44 and 46, 48 and 50, 52 and 54, and 56 and 58, respectively, of each half of the respective plate structures, are fitted together in abutting relationship. And as described above, the plates are superimposed one above the other with their fitted surfaces all aligned with a common vertical plane indicated by the dotted line 59 in Figs. 1 and 2. The plates are all locked together by a plurality of bolts 60 passing through the several plates and screw threaded into one of the base plate portions 40 or 42. Bolts 60 pass respectively through plates 48, 50, 56 and 58 with a close fit. The first electrode retainer plate portion 44 is slightly spaced from the alignment plate portion 48 by the use of a spacer bushing 62 mounted one on each bolt 60 and resting on plate 40. Each bushing 62 has a length slightly longer than the thickness of plate 44, and the aperture 64 in plate 44 through which bolt 60 and bushing 62 pass is made considerably larger than the outer diameter of bushing 62. Thus, plate 44 can be moved relative to the base structure portion 40 and the alignment plate portion 48. In a similar manner the first electrode retainer plate portion 46 is mounted for relative sliding movement with respect to plate portions 42 and 50. The electrode retainer plate 52 is also spaced from the retainer plate portion 56 by the use of a spacer bushing 66. Also the aperture 68 in plate 52 and through which bolt 60 and bushing 66 pass is considerably larger than the bushing 66. This, then allows the plate portion 52 to be moved relative to the adjacent plate portions 56 and 48, and, in a similar manner, the second electron retainer plate portion 54 is mounted for relative sliding movement with respect to the adjacent plate portions 50 and 58.

The base structure plate 40 is rigidly fastened by welding for example to the support plate 36, while the base structure plate portion 42 is fixed by welding, for example, to a plate 70 slidably mounted on a portion of the support plate 38. Thus, all of the semi-cylindrical plate portions 40, 48 and 56 are fixed directly to the base plate 40 by bolts 60 while the respective matching plate portions 42, 50, and 58 are also fixed to plate 42 by the remaining bolts 60.

As shown in Figures 1 and 2, the retainer plate portions 56 and 58 as well as the alignment plate portions 48 and 50 are formed at their centers with a semi-cylindrical aperture 72, respectively, while the base structure plate portions 40 and 42, the first electrode retainer plate portions 44 and 46, and the second retainer plate portions 52 and 54, are formed with a center bore 74 of a size to fit the tubular electrode structures 14, 18 and 22 respectively. All of the plate structures 40 and 42, 44 and 46, 48 and 50, 52 and 54 include cut-out portions 80 for providing clearance of the glass rods 32 of the electrode assembly unit, when mounted within the alignment device.

To align the apertures 26, 28 and 25 of the electrode mount structure, shown in Figure 3, the electrode mount is placed into the alignment unit by first moving plate 70 to the right, in the showing of Figure 1, to open the alignment unit for loading the electrode structure. Plate 70 can be moved, by manually operating a locking ring 75, which is rotatably mounted on a shaft 76. A handle 78 threaded at 77 into locking ring 75 is used to rotate locking ring 75 about shaft 76. A stud 79 fixed to plate 70 rides in a spiral cam slot 81, in order to move plate 70 to open and closed position. Plate 70 carries plates 42, 46, 50, 54 and 58 with it from one position to the other. In the open position, the electrode assembly of Figure 3 is placed into the alignment device so that the electrode cylinder 14 rests on supporting portions 82 of plates 40 and 42 respectively. The glass rods 32 are retained within the apertures 80. Electrode 14 is supported so that plate 16 rests just below the top surface of plates 40 and 42, while the apertured plate 20 of electrode 18 rests above the contacting surfaces of plates 40 and 44 respectively and 42 and 46 respectively. Electrode 22 extends through the aperture 72 of plates 48 and 50 and into the aperture 74 of plates 52 and 54.

The operator with the aid of the locking ring 75 moves plate 70 toward the left, in the showing of Figure 1, into closing position so that electrode 14 is tightly held between plates 40 and 42, electrode 18 between plates 44 and 46 and electrode 22 between plates 52 and 54. The operator, then, with the aid of a microscope 84 (partially shown) positioned on the axis of the device can sight through the electrode structure to determine the alignment of the apertures 26, 28 and 25. Since aperture 25 is considerably larger than apertures 26 and 28, these apertures, 26 and 28, are aligned first with each other. This is accomplished with the use of a manually operable tool having a lever arm 86 which is pivotally mounted at 88 to a carriage 90 having a pair of bearing wheels 92 (Fig. 2), whereby the carriage 90 may be moved along an endless track 94 around the upper periphery of the plates 48 and 50. Lever arm 86 has a projecting portion 96 extending into a point adjacent to the peripheral edge of plate 44 or 46 depending upon the position of the correcting lever 86.

Lever 86 is carried by carriage 90 around the track 94 to the appropriate position, where the operator by pressing downwardly on the lever 86 causes the projecting portion 96 of the lever to press against the outer surface of ring 44—46. Sufficient pressure is used by the operator to physically move electrode 18 in the proper direction to align the apertures 26 and 28. The amount of correction is normally in the order of mils so that the actual physical displacement of electrode 18 relative to the fixed electrode 14 is small.

With apertures 26 and 28 aligned, the operator locks plates 44 and 46 in position by the use of locking pins 98 and 100. These pins are threaded respectively into plates 40 and 42, and when the pins are turned by the operator, their upper ends will be moved into engagement with the lower surface of plates 44 and 46 respectively. Since plate 40 is rigidly fixed to the support plate 36, and plate 42 is locked in closed position with the sliding plate 70, pins 98 and 100 will thus lock plates 44 and 46 respectively from any relative movement. Aperture 25 is now aligned with the aligned apertures 26 and 28 with the correcting lever 86, by moving the lever upwardly. A beveled portion 102 of lever 86 will contact the adjacent portion of ring 52—54. By using an appropriate amount of force on lever 86, ring 52—54 is moved by the operator in the appropriate direction to align aperture 25 with the other two apertures 26 and 28.

The carriage 90 and the circular track 94 permits the application of the alignment correction at any place around the axis 31 of the gun assembly. Since the actual correction applied to the several electrodes is relatively small, the electrode parts will bend sufficiently to allow for the correction without distorting the parts or breaking the glass beads 32. Also, the electrode parts will remain in their aligned positions with no tendency to return to the misaligned condition which they had before corrections were applied.

The advantages of such a correcting device are considerable in the fabrication of a gun mount of the type shown in Figure 3. It has been found that during the application of the glass beads 32 and where a beading jig or mandrel is used, that considerable misalignment if not actual distortion of parts occurs upon the removal of the electrode mount structure from the beading mandrel. This distortion of parts occurs irrespective of the skill of the operator and has resulted in considerable scrap losses because of the inability to utilize misaligned electrode parts. One solution for correcting the trouble would be to utilize expensive precision parts in the tools used to fabricate the electrode mount. This would necessitate fixtures, such as a beading mandrel, which are carefully made to close tolerances and would also necessitate a very careful and slow fabrication procedure to prevent any undue distortion of the parts during and after their assembly. Such an expediency besides being costly would result in a low production rate as well as low production efficiency. With the correcting device described above, inexpensive equipment in which the tolerances are not too exacting can be used for assembling the gun parts. Furthermore, no highly skilled operator is required to maintain a high degree of accuracy and skill, such as would be the case if the alignment device were not available.

The alignment device described also lends itself to the alignment of electrode parts which are difficult to align by direct view of the microscope 84. For example, the modification in Figure 4, is for a gun mount of the type shown, in which a plurality of electrodes 104, 106 and 108 are assembled and wherein one electrode 108 has a bend at 109 so that a direct line view from the top of the electrode assembly cannot be obtained through to apertures 105 and 107, of electrodes 104 and 106, respectively which are to be aligned. To align the apertures of such a gun mount of this type, a mirror 112 is mounted on ring 48 and extends into the aperture 72. The mirror is positioned so as to pass between electrodes 108 and 106 with the surface of mirror 112 positioned directly over the apertures 105 and 107, which are to be aligned. A second mirror 114 extends from the plate 50 diametrically across from mirror 110. Mirror 114 has its surface arranged parallel to mirror surface 112. These surfaces are at 45° to the vertical so that the images of apertures 105 and 107 are reflected by mirror 112 to the mirror surface 114 and vertical upwardly to the microscope 84.

The alignment device has been described for use with apertured electrodes for a cathode-ray tube. However, with appropriate shaping of the central portion of the semi-cylindrical rings of the device, it is possible to adapt the device for the alignment of apertured electrodes for other types of discharge devices, as well as the alignment of apertures of any assembly of parts.

What is claimed is:

1. A device for aligning apertures in a plurality of electrodes joined together in a unitary structure, said device comprising a base structure including at least two portions mounted for movement relative to each other, means for supporting one of said electrodes between said two base structure portions, means connected to said two base structure portions for moving said two base structure portions together to grip said one electrode, a retainer plate structure slidably mounted on said two base structure portions and including means for contacting the periphery of a second one of said electrodes, and means for sliding said retainer plate structure over said base structure to align apertures in said two electrodes.

2. A device for aligning apertures in a plurality of members joined together in a unitary structure, said device comprising a base structure including at least two portions mounted for movement relative to each other, means for supporting a first one of said members between said two base structure portions, means connected to one of said two base structure portions for moving said two base structure portions together to grip said first one of said members, a retainer plate structure slidably mounted on said two base structure portions and including means for contacting the periphery of a second one of said members, and means for sliding said retainer plate structure over said base structure to align apertures in said first and second ones of said members, said last means including a lever pivotally mounted on said base structure to contact and move said retainer plate structure.

3. A device for aligning apertures in a plurality of electrodes joined together in a unitary structure, said device comprising a base structure adapted to support a first one of said electrodes, a retainer plate structure slidably mounted on said base structure and including means for contacting the periphery of a second one of said electrodes, means for moving said retainer plate structure relative to said base structure, said base structure including means for clamping thereto said first electrode, and means mounting said retainer plate structure moving means on said base structure for movement around the periphery of said retainer plate structure whereby an aperture in said second one of said electrodes may be aligned with an aperture in said first one of said electrodes.

4. A device for aligning apertures in a plurality of electrodes joined together in a unitary structure, said device comprising a base structure adapted to support a first one of said electrodes, a retainer plate structure slidably mounted on said base structure and including means for contacting the periphery of a second one of said electrodes, means for moving said retainer plate structure relative to said base structure, said base structure including means for clamping thereto said first electrode, and means mounting said retainer plate structure moving means on said base structure for movement around the periphery of said retainer plate structure whereby an aperture in said second one of said electrodes may be aligned with an aperture in said first one of said electrodes, said mounting means including a track mounted adjacent to said retainer plate structure and means slidably mounted on said track and supporting said retainer plate structure moving means.

5. A device for aligning apertures in a plurality of electrodes joined together in a unitary structure, said device comprising a base structure including at least two portions movably mounted relative to each other, means for supporting one of said electrodes between said two base structure portions, means connected to one of said two base structure portions for moving said two base structure portions together to grip said one electrode, a retainer plate structure slidably mounted on said two base structure portions and including means for contacting the periphery of a second one of said electrodes, and means for sliding said retainer plate structure over said base structure to align apertures in said two electrodes, said last means including an endless track adjacent to said retainer plate structure and means mounted on said track to contact the periphery of said retainer plate structure.

6. A device for aligning apertures in a plurality of electrodes joined together in a unitary structure, said device comprising a base structure including at least two portions movably mounted relative to each other, means for supporting one of said electrodes between said two base structure portions, means connected to one of said two base structure portions for moving said two base structure portions together to grip said one electrode, a retainer plate structure slidably mounted for movement in a plane on said two base structure portions and including means for contacting portions of a second one of said electrodes, and means for sliding said retainer plate structure over said base structure to align apertures in said two electrodes, said last means including an endless track adjacent to said retainer plate structure, a lever, and means mounting said lever on said track for pivotal movement into contact with said retainer plate structure, said lever mounting means supported for movement along said track whereby alignment of said apertures may made by moving said retainer plate structure in said plane from any direction.

7. A device for aligning apertures in a plurality of apertured members joined together in a unitary structure, said device comprising a base structure adapted to rigidly support a first one of said apertured members, a first retainer plate structure mounted for movement on said base structure and including means for contacting in operative relationship a second one of said electrodes, a second retainer plate structure mounted for movement on said base structure and including means for contacting in operative relationship a third one of said apertured members, and means for moving said first and second retainer plate structures relative to said base structure for aligning apertures in said first, second and third ones of said apertured members.

8. A device for aligning apertures in a plurality of electrodes joined together in a unitary structure, said device comprising a base structure adapted to support a first one of said electrodes, a first retainer plate structure mounted for movement on said base structure and including means for contacting the periphery of a second one of said electrodes, a second retainer plate structure mounted for movement on said base structure and including means for contacting the periphery of a third one of said electrodes, means for moving said first and second retainer plate structures relative to said base structure, and means mounting said retainer plate structure moving means on said base structure for movement around the peripheries of said first and second retainer plate structures whereby an aperture in said second and third ones of said electrodes may be aligned with an aperture in said first one of said electrodes.

9. A device for aligning apertures in a plurality of electrodes joined together in a unitary structure, said device comprising a base structure adapted to support a first one of said electrodes, a first retainer plate structure mounted for movement on said base structure and including means for contacting a second one of said electrodes, a second retainer plate structure mounted for movement on said base structure and including means for contacting a third one of said electrodes, means for moving said first and second retainer plate structures relative to said base structure, means mounting said retainer plate structure moving means on said base structure for movement around the peripheries of said first and second retainer plate structures whereby an aperture in said second and third ones of said electrodes may be aligned with an aperture in said first one of said electrodes, said mounting means including a track mounted adjacent to said first and second retainer plate structures, and means slidably mounted on said track and supporting said retainer plate structure moving means.

10. A device for aligning apertures in a plurality of electrodes joined together in a unitary structure, said device comprising a base structure adapted to support a first one of said electrodes, a first retainer plate structure mounted for movement in a first plane on said base structure and including means for contacting the periphery of a second one of said electrodes, a second retainer plate structure mounted for movement in a second plane on said base structure and including means for contacting the periphery of a third one of said electrodes, means for moving said first and second retainer plate structures relative to said base structure, said last means including an endless track adjacent to said first and second retainer plate structures, a lever, means mounting said lever on said track for pivotal movement into contact with said first and second retainer plate structures, said mounting means supported for movement along said track whereby alignment of said apertures may be made by moving said first and second retainer plates in said first and second planes respectively from any direction.

References Cited in the file of this patent
UNITED STATES PATENTS

| | | |
|---|---|---|
| 1,448,528 | Elliott | Mar. 13, 1923 |
| 1,995,711 | Irmis | Mar. 26, 1935 |
| 2,341,284 | Payne | Feb. 8, 1944 |
| 2,350,436 | Whistler et al. | June 6, 1944 |
| 2,527,150 | Quinlan | Oct. 24, 1950 |
| 2,779,040 | Scarff | Jan. 29, 1957 |